(12) United States Patent
Carlson et al.

(10) Patent No.: US 9,239,037 B2
(45) Date of Patent: Jan. 19, 2016

(54) SPLIT BANK AND MULTIMODE SKIP FIRE OPERATION

(71) Applicant: Tula Technology, Inc., San Jose, CA (US)

(72) Inventors: Steven E. Carlson, Oakland, CA (US); Xin Yuan, Palo Alto, CA (US); Louis J. Serrano, Los Gatos, CA (US); Joshua P. Switkes, Menlo Park, CA (US); Biswa R. Ghosh, Los Altos, CA (US); Norman C. Lo, Milpitas, CA (US)

(73) Assignee: Tula Technology, Inc., San Jose, CA (US)

( * ) Notice: Subject to any disclaimer, the term of this patent is extended or adjusted under 35 U.S.C. 154(b) by 378 days.

(21) Appl. No.: 13/963,759

(22) Filed: Aug. 9, 2013

(65) Prior Publication Data

US 2014/0041630 A1     Feb. 13, 2014

Related U.S. Application Data

(60) Provisional application No. 61/682,151, filed on Aug. 10, 2012.

(51) Int. Cl.
| | |
|---|---|
| *F02P 9/00* | (2006.01) |
| *F02D 41/00* | (2006.01) |
| *F02P 5/15* | (2006.01) |
| *F02P 7/02* | (2006.01) |
| *F02D 41/14* | (2006.01) |
| *F02D 41/30* | (2006.01) |

(52) U.S. Cl.
CPC ............... *F02P 9/00* (2013.01); *F02D 41/0087* (2013.01); *F02P 5/1506* (2013.01); *F02D 41/0082* (2013.01); *F02D 41/1402* (2013.01); *F02D 41/3058* (2013.01); *F02D 2200/602* (2013.01); *F02P 7/02* (2013.01); *Y02T 10/46* (2013.01)

(58) Field of Classification Search
CPC .............. F02P 9/00; F02P 5/1506; F02P 7/02; F02D 41/00; F02D 41/0087; F02D 2041/0012; F02D 2250/21; F02D 13/06; F02D 17/02; Y02T 10/46
See application file for complete search history.

(56) References Cited

U.S. PATENT DOCUMENTS

| | | |
|---|---|---|
| 4,129,109 A | 12/1978 | Matsumoto |
| 4,337,740 A | 7/1982 | Sugasawa et al. |
| 4,434,767 A | 3/1984 | Kohama et al. |
| 4,489,695 A | 12/1984 | Kohama et al. |
| 4,509,488 A | 4/1985 | Forster et al. |
| 5,117,790 A | 6/1992 | Clarke et al. |
| 5,377,631 A | 1/1995 | Schechter |

(Continued)

OTHER PUBLICATIONS

International Search Report dated Nov. 1, 2013 from International Application No. PCT/US2013/054420.

(Continued)

*Primary Examiner* — Hieu T Vo
(74) *Attorney, Agent, or Firm* — Beyer Law Group LLP (57) ABSTRACT

Various methods and arrangements for operating a skip fire engine control system are described. In one aspect of the invention, a distinct firing sequence is determined for each bank of working chambers that is used to operate the bank in a skip fire manner. Each firing sequence uses a different firing fraction. In another aspect of the invention, a determination is made as to whether a firing sequence should be dynamically generated or selected from a set of predefined firing sequences.

20 Claims, 10 Drawing Sheets

(56) References Cited

U.S. PATENT DOCUMENTS

| | | | |
|---|---|---|---|
| 5,540,633 | A | 7/1996 | Yamanaka et al. |
| 5,584,281 | A | 12/1996 | Katoh |
| 6,158,411 | A | 12/2000 | Morikawa |
| 6,360,724 | B1 | 3/2002 | Suhre et al. |
| 6,415,601 | B1 | 7/2002 | Glugla et al. |
| 6,553,962 | B1 | 4/2003 | Russ et al. |
| 6,571,772 | B1 | 6/2003 | Ott et al. |
| 6,619,258 | B2 | 9/2003 | McKay et al. |
| 6,619,267 | B1 | 9/2003 | Pao |
| 6,735,938 | B2 | 5/2004 | Surnilla |
| 6,769,398 | B2 | 8/2004 | Surnilla et al. |
| 6,823,830 | B2 | 11/2004 | Azuma |
| 6,823,835 | B2 | 11/2004 | Dunsworth et al. |
| 6,978,204 | B2 | 12/2005 | Surnilla et al. |
| 7,000,602 | B2 | 2/2006 | Cullen et al. |
| 7,032,545 | B2 | 4/2006 | Lewis et al. |
| 7,032,572 | B2 | 4/2006 | Bidner et al. |
| 7,032,581 | B2 | 4/2006 | Gibson et al. |
| 7,063,062 | B2 | 6/2006 | Lewis et al. |
| 7,069,910 | B2 | 7/2006 | Surnilla et al. |
| 7,086,386 | B2 | 8/2006 | Doering |
| 7,249,583 | B2 | 7/2007 | Bidner et al. |
| 7,260,467 | B2 | 8/2007 | Megli et al. |
| 7,503,312 | B2 | 3/2009 | Surnilla et al. |
| 7,532,972 | B2 | 5/2009 | Kolmanovsky et al. |
| 7,555,896 | B2 | 7/2009 | Lewis et al. |
| 7,650,745 | B2 | 1/2010 | Lewis |
| 7,836,866 | B2 | 11/2010 | Luken et al. |
| 7,900,596 | B2 | 3/2011 | Hartmann et al. |
| 7,930,087 | B2 | 4/2011 | Gibson et al. |
| 7,941,994 | B2 | 5/2011 | Surnilla et al. |
| 7,950,359 | B2 | 5/2011 | Choi |
| 7,963,267 | B2 | 6/2011 | Surnilla et al. |
| 8,225,771 | B2 | 7/2012 | Aso et al. |
| 8,839,766 | B2 * | 9/2014 | Serrano ............... F02D 41/0087 123/198 DB |
| 2002/0116917 | A1 | 8/2002 | Glugla et al. |
| 2002/0195087 | A1 | 12/2002 | Dunsworth et al. |
| 2007/0051092 | A1 | 3/2007 | Pallett et al. |
| 2007/0051351 | A1 | 3/2007 | Pallett et al. |
| 2008/0066450 | A1 | 3/2008 | Surnilla et al. |
| 2009/0301060 | A1 | 12/2009 | Kennie et al. |
| 2010/0050993 | A1 | 3/2010 | Zhao et al. |
| 2011/0202262 | A1 | 8/2011 | Gibson et al. |
| 2012/0143471 | A1 | 6/2012 | Tripathi et al. |

OTHER PUBLICATIONS

Written Opinion dated Nov. 1, 2013 from International Application No. PCT/US2013/054420.

\* cited by examiner

SPLIT BANK AND MULTIMODE SKIP FIRE OPERATION

CROSS REFERENCE TO RELATED APPLICATIONS

This application claims priority of U.S. Provisional Application No. 61/682,151, entitled "Split Bank and Multimode Skip Fire Operation," filed Aug. 10, 2012, which is hereby incorporated by reference in its entirety for all purposes.

FIELD OF THE INVENTION

The present invention relates generally to skip fire operation of an internal combustion engine. Various embodiments relate to treating banks of an engine's working chambers differently during skip fire operation. Other embodiments relate to operating a skip fire engine controller in multiple modes.

BACKGROUND

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. Engine control approaches that vary the effective displacement of an engine by sometimes skipping the firing of certain cylinders are often referred to as "skip fire" engine control. In general, skip fire engine control is understood to offer a number of potential advantages, including the potential of significantly improved fuel economy in many applications. Although the concept of skip fire engine control has been around for many years, and its benefits are understood, skip fire engine control has not yet achieved significant commercial success.

It is well understood that operating engines tend to be the source of significant noise and vibrations, which are often collectively referred to in the field as NVH (noise, vibration and harshness). In general, a stereotype associated with skip fire engine control is that skip fire operation of an engine will make the engine run significantly rougher than conventional operation. In many applications such as automotive applications, one of the most significant challenges presented by skip fire engine control is vibration control. Indeed, the inability to satisfactorily address NVH concerns is believed to be one of the primary obstacles that has prevented widespread adoption of skip fire types of engine control.

SUMMARY

A variety of methods and arrangements for managing different banks or groups of working chambers in a skip fire engine control system are described.

In one aspect of the invention, an engine controller is used to operate an internal combustion engine in a skip fire manner. The engine includes multiple working chambers that are organized into multiple banks. The engine controller includes a firing fraction calculator and a firing timing determination module. The firing fraction calculator is arranged to generate a firing fraction that delivers a desired amount of torque. The firing timing determination module is arranged to independently determine a distinct firing sequence for each bank for operating the bank in a skip fire manner. The operation of each bank may use a different firing fraction. Accordingly, the engine controller is able to treat each bank of working chambers differently, which can help reduce noise, vibration and harshness (NVH) generated by the engine.

The mechanisms used to manage the different groups of working chambers may vary widely, depending on the needs of a particular application. In some embodiments, for example, a distinct firing fraction and/or firing sequence is generated for each bank. In still other embodiments, the firing sequence can be selected from a set of predefined firing sequences or determined dynamically using an adaptive predictive algorithm.

In another aspect of the invention, a firing fraction calculator generates a firing fraction that delivers a desired amount of torque. A firing timing determination module is arranged to generate a corresponding firing sequence in one of at least two ways. The firing sequence can be generated dynamically e.g., using an adaptive predictive algorithm and/or on a firing opportunity by firing opportunity basis. Alternatively, the firing sequence can be selected from a set of multiple predefined firing sequences. This determination is based at least in part on the firing fraction. In various embodiments, in the latter instance, a different predefined firing sequence is selected for each bank of working chambers.

In another aspect of the invention, a multimode engine controller is used to operate an internal combustion engine using a split bank controller or a non-split bank controller. The engine controller includes a firing fraction calculator, a non-split bank controller, a split bank controller and a transition module. The firing fraction calculator is arranged to generate a primary firing fraction that delivers a desired amount of torque. The non-split bank controller is arranged to generate a firing sequence to operate all the working chambers in the engine based on the primary firing fraction such that the desired amount of torque is delivered. The split bank controller is arranged to generate distinct firing sequences for at least two different subsets of the working chambers, respectively. In various embodiments, the distinct firing sequences are based on different firing fractions. The firing sequences generated by the split bank controller are used to operate the working chambers such that they collectively deliver the desired amount of torque. The transition module is arranged to determine whether the non-split bank controller or the split bank controller is used to generate firing sequence (s) for the working chambers e.g., whether a single firing sequence is used to operate all the working chambers, or whether different firing sequences are used to operate distinct subsets or banks of working chambers in a different manner. The sequences generated by both controllers are arranged to operate the working chambers in a skip fire manner. In some embodiments, the split bank controller is used (only) for particular primary firing fractions or subsets of firing fractions and the non-split bank controller is used for other firing fractions and/or transitions between those particular firing fractions.

In another aspect of the invention, a multimode engine controller is used to operate an internal combustion engine. The engine controller includes a firing fraction calculator, a transition module, a first controller and a second controller. The firing fraction calculator is arranged to generate a firing fraction that delivers a desired amount of torque. The first and second controllers are arranged to dynamically generate, based on the firing fraction, a firing sequence for operating the working chambers of the engine in a skip fire manner. Each of the controllers dynamically generates the firing sequence using a different algorithm or technique. The transition module determines (e.g., based on the firing fraction) which controller or technique is used to dynamically generate the firing sequence. In various embodiments, dynamic generation of a firing sequence involves generating a firing sequence that is not predefined. In other embodiments, dynamic generation of a firing sequence involves generating the firing sequence on a firing opportunity by firing opportunity basis, or by groups of firings. In some embodiments, one of the controllers uses a sigma delta converter to generate the firing sequence.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale

DETAILED DESCRIPTION

The present invention relates generally to methods and mechanisms for reducing undesirable NVH during skip fire operation by treating banks of working chambers in a different manner.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. Although skip fire operation offers substantial benefits in terms of fuel efficiency, the uneven generation of torque can produce undesirable vibrations and noise.

Figure 1:
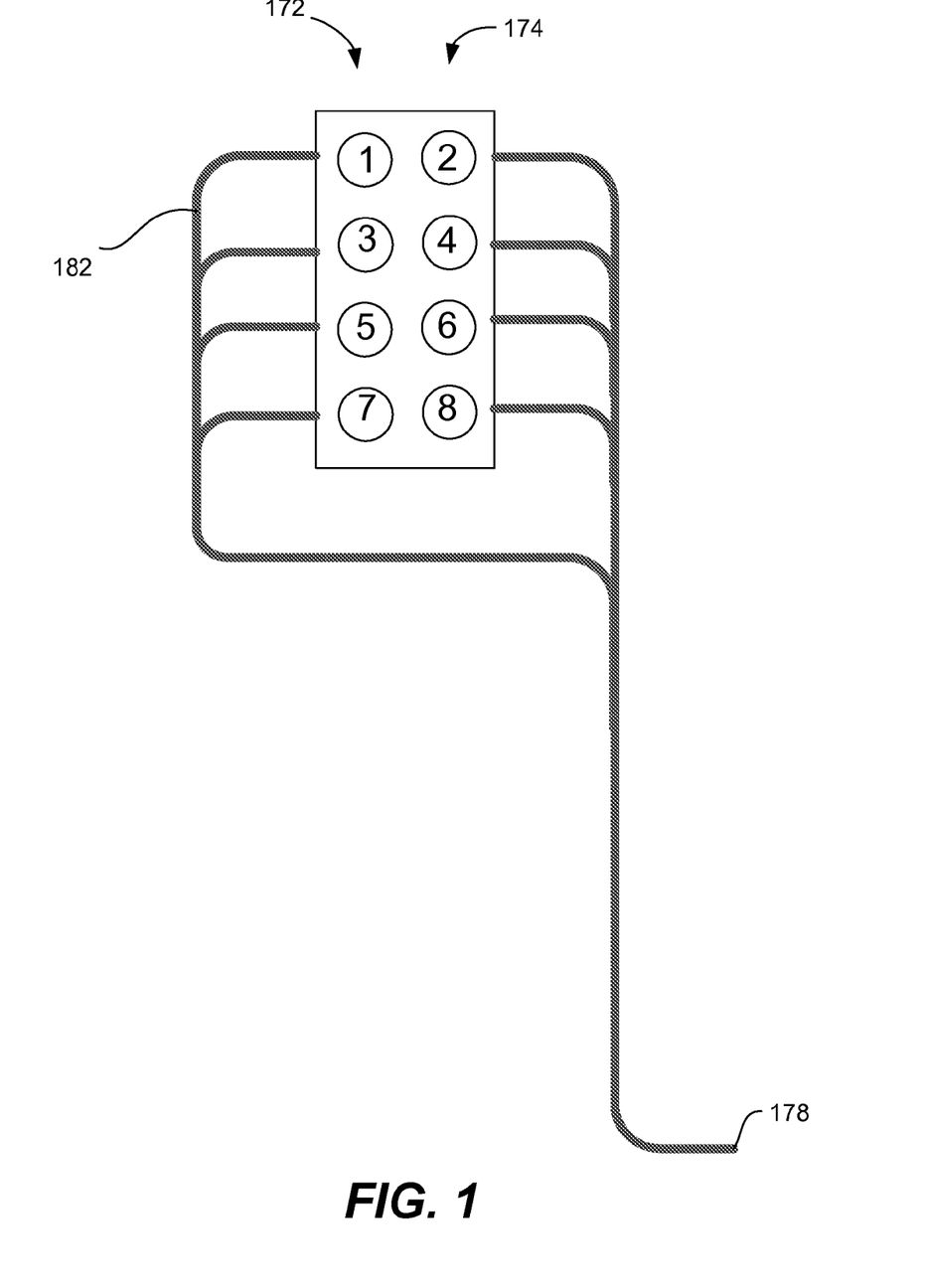
FIG. 1 is a diagram of a representative engine, exhaust manifold and exhaust piping according to one embodiment of the present invention.

One source of noise is the tailpipe. This issue will be discussed in further detail below in connection with FIG. 1. FIG. 1 is a diagram of a representative internal combustion engine with eight cylinders. Cylinders 1, 3, 5 and 7 are in a first bank 172; cylinders 2, 4, 6 and 8 are in a second bank 174. Each bank of cylinders has an associated exhaust manifold 182. In many vehicles, the exhaust manifolds are coupled to exhaust pipes which join together and eventually lead to a tail pipe having a tail pipe outlet 178.

After any given cylinder is fired, the gases left over from the combustion event are delivered through the cylinder's corresponding exhaust manifold and exhaust pipe to the tailpipe outlet 178. In some engines, the gases from the first bank 172 have farther to travel then those from the second bank 174 as illustrated in FIG. 1. For example, in the illustrated embodiment, the length of exhaust pipe linking bank 172 to the tailpipe outlet 178 is substantially longer than the one for bank 174.

This difference in the lengths of the pipes for the banks can generate undesirable NVH when particular fractions of the cylinders are fired. In particular, problems can occur when firings occur in one bank and then the other in an alternating, regular pattern. For example, consider an engine that is arranged to fire the cylinders in the order 1-8-7-2-6-5-4-3 (assuming every cylinder is fired in order). If the firing fraction is ⅓ and involves firing every third cylinder and skipping two cylinders, then the order of combustion events will be 2-4-8-6-3-7-5-1.

The combustion events for cylinders 3-7-5-1 are all from the first bank 172, while the other combustion events (2-4-6-8) are all from the second bank 174. The sounds generated by the first bank are delayed relative to the second bank due to the different pipe distances that the sounds from the first and second banks must travel to reach the tailpipe outlet. The sound generated by the banks thus has an alternating pattern, which can be perceived by occupants in the vehicle.

Various embodiments of the present invention address the above issue. In particular, each working chamber is not necessarily treated the same, but instead treatment may differ depending on the bank to which it belongs. In some embodiments, for a particular requested firing fraction that has some undesirable NVH characteristics, a different firing fraction and firing sequence can be applied to each bank while generating the same overall amount of torque.

Figure 2:
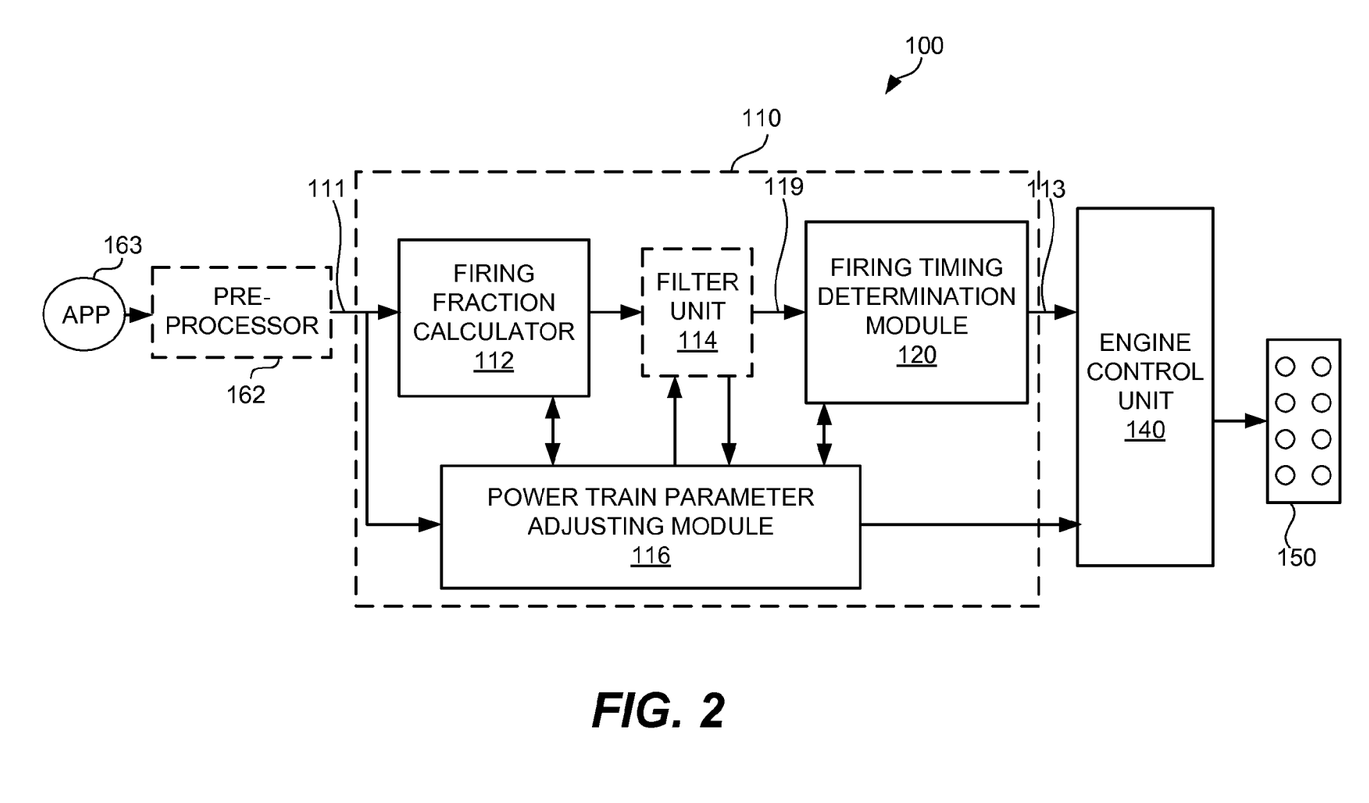
FIG. 2 is a skip fire engine controller arranged to operate working chambers differently based on bank location according to one embodiment of the present invention.

Referring initially to FIG. 2, a skip fire engine controller 100 in accordance with one embodiment of the present invention will be described. The engine controller 100 includes a skip fire controller 110 arranged to work in conjunction with an engine control unit (ECU) 140. In other embodiments, the functionality of the skip fire controller 110 may be incorporated into the ECU 140. The illustrated skip fire controller 100 includes a firing fraction calculator 112, an optional filter unit 114, a power train parameter adjusting module 116, and a firing timing determining module 120. The skip fire controller 110 receives an input signal 111 indicative of a desired engine output and is arranged to generate a sequence of firing commands that cause an engine 150 to provide the desired output using a skip fire approach.

In the embodiment of FIG. 2, the input signal 111 is treated as a request for a desired engine output. The signal 111 may be received or derived from an accelerator pedal position sensor (APP) 163 or other suitable sources, such as a cruise controller, a torque controller, etc. In FIG. 2 an optional preprocessor 162 may modify the requested output prior to delivery to the skip fire controller 110. However, it should be appreciated that in other implementations, the accelerator pedal position sensor (or the requested output) 163 may communicate directly with the skip fire controller 110.

The firing fraction calculator 112 receives input signal 111 and is arranged to determine a skip fire firing fraction that would be appropriate to deliver the desired output under selected engine operating conditions. This overall firing fraction is meant to apply to all of the working chambers and does not distinguish working chambers by bank or by their location relative to the tailpipe outlet. The firing fraction is indicative of the percentage of firings under the current (or directed) operating conditions that are required to deliver the desired output. Under some conditions, the firing fraction may be determined based on the percentage of optimized firings that are required to deliver the driver requested engine torque (e.g., when the working chambers are firing at an operating point substantially optimized for fuel efficiency). However, in other instances, different level reference firings, firings optimized for factors other than fuel efficiency, the current engine settings, etc. may be used in determining the appropriate firing fraction. It should be appreciated that a firing fraction may be conveyed or represented in a wide variety of ways. For example, the firing fraction may take the form of a firing pattern, sequence or any other firing characteristic that involves or inherently conveys the aforementioned percentage of firings.

In the illustrated embodiment, a power train parameter adjusting module 116 is provided that cooperates with the firing fraction calculator 112. The power train parameter adjusting module 116 directs the ECU 140 to set selected power train parameters appropriately to insure that the actual engine output substantially equals the requested engine output at the commanded firing fraction. By way of example, the power train parameter adjusting module 116 may be responsible for determining the desired mass air charge (MAC) and/or other engine settings that are desirable to help ensure that the actual engine output matches the requested engine output. Of course, in other embodiments, the power train parameter adjusting module 116 may be arranged to directly control various engine settings.

The firing timing determining module 120 is arranged to issue a sequence of firing commands (e.g., drive pulse signal 113) that cause the engine to deliver the percentage of firings dictated by a commanded firing fraction 119. The sequence of firing commands takes into account the different banks and their different relative distances from the pipe outlet. That is, the firing commands are arranged to eliminate or reduce alternating sets of firings between the two banks that cause undesirable acoustic effects.

In some embodiments, this involves applying a different firing fraction to each bank of working chambers, which results also in the generation of a different sequence of firing commands for the corresponding bank. The weighted sum of the firing fractions of the banks will approximately equal that of the overall firing fraction that was generated by the calculator 112. Consider an example in which the commanded firing fraction is ⅓. In one possible approach, the first and second banks 172 and 174 are then operated using a firing fraction of ⅔ and 0, respectively. That is, ⅔rds of the cylinders in one of the banks are fired and none of the cylinders in the second bank are fired. This still results in a ⅓$^{rd}$ overall firing fraction, but since there are no firings in bank 1 and all of the firings take place in bank 2, the problem of alternating sets of firings is eliminated.

The exact process and mechanisms used to address the problem of alternating sounds and firings can vary widely, depending on the needs of a particular application. In some embodiments, distinct firing fractions and/or firing command sequences are applied independently to different banks. In other embodiments, a single sequence of firing commands is generated that takes into account the different banks and reduces the undesirable alternating sound pattern. Various implementations involve the ability to switch between different modes (e.g., between a split bank mode and a non-split bank mode), depending on the firing fraction. This approach will be discussed below in further detail in connection with FIG. 6.

The firing timing determining module 120 may take a wide variety of different forms. Various implementations involve a module 120 that includes multiple submodules, each of which is arranged to generate a distinct sequence of firing commands for one of the banks. The outputs of the submodules are passed through a multiplexer, which selects what particular sequence will be used to operate the engine. In some embodiments, these submodules utilize lookup tables to implement desired control algorithms. In other embodiments, a sigma delta converter or adaptive predictive controller (APC) is used. The selected sequence of firing commands (sometimes referred to as a drive pulse signal 113) is outputted by the firing timing determining module 120 may be passed to an engine control unit (ECU) or combustion controller 140 which orchestrates the actual firings.

In the embodiment illustrated in FIG. 2, the output of the firing fraction calculator 112 is optionally passed through a filter unit 114 before it is delivered to the firing timing determining module 120. The filter unit 114 is arranged to mitigate the effect of any step change in the commanded firing fraction such that the change in firing fraction is spread over a longer period. This "spreading" or delay can help smooth transitions between different commanded firing fractions and can also be used to help compensate for mechanical delays in changing the engine parameters.

Although the above techniques address acoustic issues relating to different exhaust pipe lengths, the skip fire engine controller 110 can be used for any application in which it is advantageous to treat a subset of working chambers differently from another subset. By way of example, the above techniques may be used for onboard diagnostic (OBD) applications. In various OBD applications, it may be desirable to shut off or treat differently a bank or subset of working chambers for catalyst diagnostics, individual cylinder diagnostics, fuel control adaptation or other purposes. In another example, the skip fire engine controller 100 can also be used to accelerate the warm up time of a vehicle. This will be described with reference to FIG. 10, which is a representative diagram of an engine 1002 with two banks 1008/1010 that are linked by exhaust pipes to two catalytic converters 1004/1012, respectively. The catalytic converters 1004 and 1012 are in turn connected to a final catalytic converter 1006. The catalytic converters are arranged in series such that the exhaust from bank 1008 flows through catalytic converter 1004 before flowing through catalytic converter 1006. Similarly, the exhaust from bank 1010 flows through catalytic converter 1012 before flowing through catalytic converter 1006.

Figure 10:
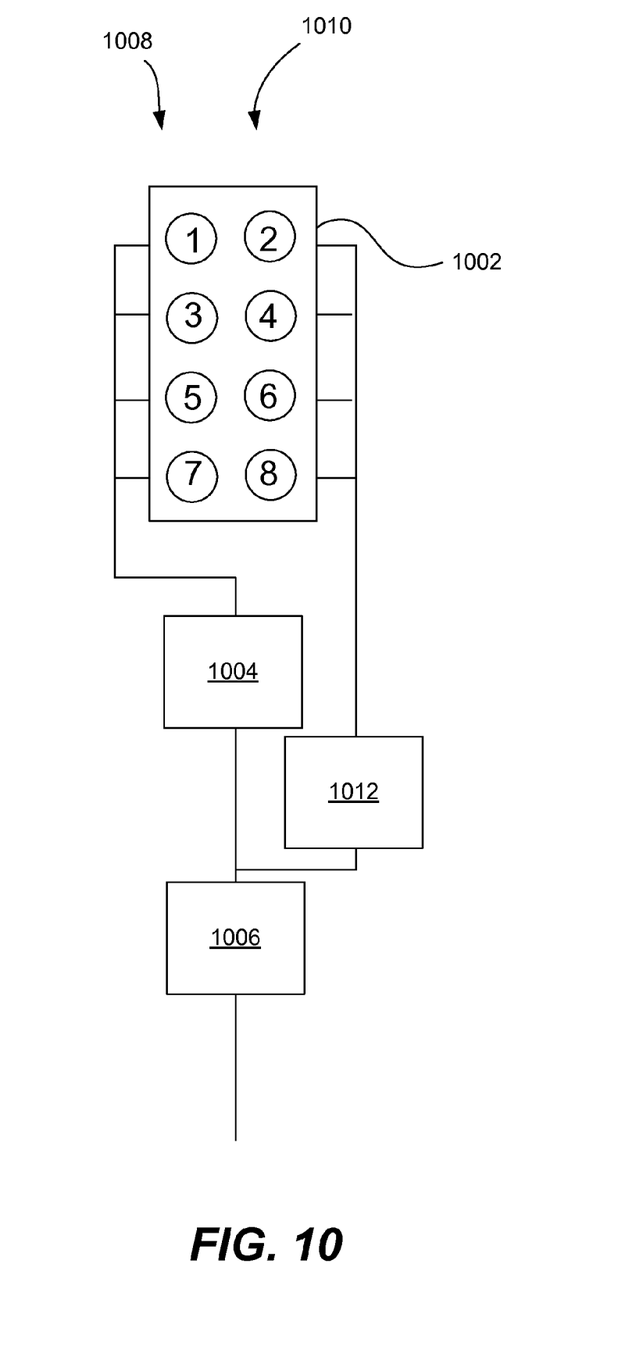
FIG. 10 is a diagram of a representative engine that is connected to two catalytic converters in series according to one embodiment of the present invention.

During a startup phase of a vehicle, the skip fire controller 110 is arranged to fire only selected working chambers in bank 1010, not in bank 1008. As a result, the catalytic converter 1012 is warmed up while catalytic converter 1004 remains cold. The increase in temperature improves the ability of the catalytic converters 1006 and 1012 to remove harmful pollutants from the exhaust. Since two catalytic converters are being used (1006 and 1012) rather than one, their individual warm up times are relatively shorter. After the startup phase, working chambers in both banks may be fired. Although catalytic converter 1004, which receives exhaust from bank 1008, may not be completely warmed up at that time, its exhaust will eventually be passed through catalytic converter 1006, which has been heated and can capture any remaining pollutants. In some embodiments, selected working chambers only in bank 1008, instead of bank 1010, are fired during the startup phase. This warms up catalytic converter 1004, which in turn warms up catalytic converter 1006.

The firing fraction calculator 112, the filter unit 114, the power train parameter adjusting module 116 and the firing timing determination module 120 may take a wide variety of different forms and their functionalities may alternatively be incorporated into an ECU, or provided by other more integrated components, by groups of subcomponents or using a wide variety of alternative approaches. By way of example, some suitable firing fraction calculators, firing timing determining modules, filter units, and power train parameter adjusting modules are described in co-assigned U.S. Pat. Nos. 7,954,474; 7,886,715; 7,849,835; 7,577,511; 8,099,224; 8,131,445; and 8,131,447; U.S. patent application Ser. No. 13/004,839 and Ser. No. 13/004,844; and U.S. Provisional Patent Application Nos. 61/080,192; 61/104,222; 61/682,065; 61/640,646 and 61/677,888, each of which is incorporated herein by reference in its entirety for all purposes. In various alternative implementations, these functional blocks may be accomplished algorithmically using a microprocessor, ECU or other computation device, using analog or digital components, using programmable logic, using combinations of the foregoing and/or in any other suitable manner.

Figure 3A:
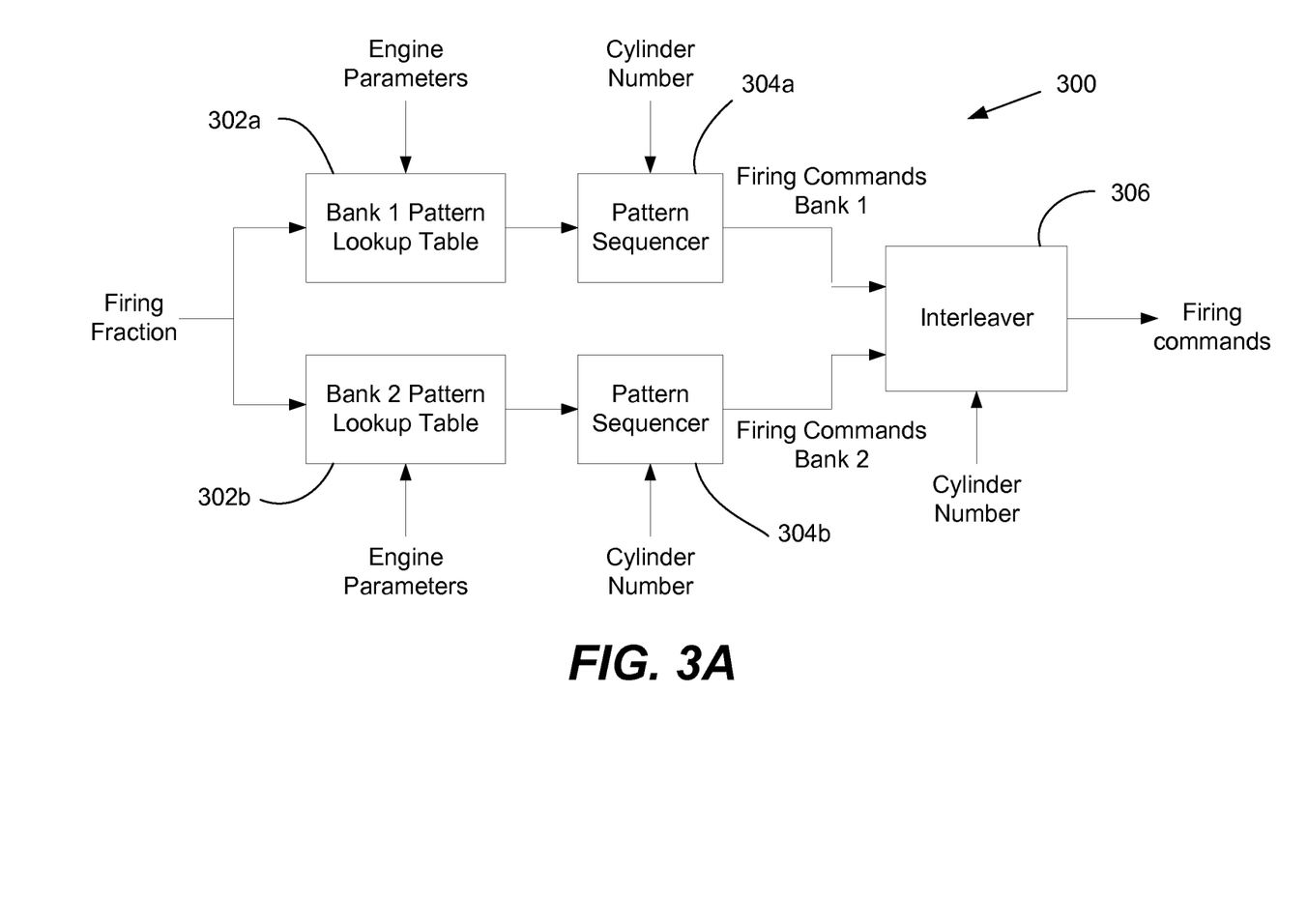
FIG. 3A is a split bank controller that uses a lookup table according to one embodiment of the present invention.

Referring next to FIG. 3A, a split bank controller 300 according to a particular embodiment of the present invention will be described. The split bank controller 300 includes a bank 1 pattern lookup table 302a, a bank 2 pattern lookup table 302b, pattern sequencers 304a and 304b and an interleaver 306. In some implementations, the tables, sequencers and interleaver are integrated into the firing timing determination module 120 of FIG. 2.

The overall firing fraction (e.g., the commanded firing fraction 119 of FIG. 2) is inputted into the bank lookup tables 302a and 302b. The bank lookup tables also receive input signals from one or more other engine settings or components, such as engine speed (RPM), manifold absolute pressure (MAP), gear etc. These parameters are used as indices for the lookup tables, which are used to help determine suitable firing patterns for each bank of working chambers (e.g., banks 172 and 174 of FIG. 1). A representative example of the lookup tables 302a and 302b are provided below:

| Bank 1 | | 1000 to 2000 RPM | 2000 to 3000 RPM | 3000 to 4000 RPM |
|---|---|---|---|---|
| Firing Fraction | 0.66 | 1, 1, 1, 1 | 1, 1, 1, 1 | 1, 1, 0, 1, 1, 0, 1, 1, 0, 1, 1, 0 |
| | 0.50 | 1, 1, 0, 0 | 1, 1, 0, 0 | 1, 1, 0, 0 |
| | 0.33 | 1, 1, 0, 1, 1, 0, 1, 0, 1, 1, 0 | 1, 0, 0, 1, 0, 0, 1, 0, 0, 1, 0, 0 | 1, 0, 0, 1, 0, 0, 1, 0, 0, 1, 0, 0 |

| Bank 2 | | 1000 to 2000 RPM | 2000 to 3000 RPM | 3000 to 4000 RPM |
|---|---|---|---|---|
| Firing Fraction | 0.66 | 1, 0, 0, 1, 0, 0, 1, 0, 0, 1, 0, 0 | 1, 0, 0, 1, 0, 0, 1, 0, 0, 1, 0, 0 | 1, 1, 0, 1, 1, 0, 1, 1, 0, 1, 1, 0 |
| | 0.50 | 0, 0, 1, 1 | 0, 0, 1, 1 | 0, 0, 1, 1 |
| | 0.33 | 0, 0, 0, 0 | 1, 0, 0, 1, 0, 0, 1, 0, 0, 1, 0, 0 | 1, 0, 0, 1, 0, 0, 1, 0, 0, 1, 0, 0 |

Each "1" represents a firing of a working chamber while each "0" represents a skip of a working cycle in the corresponding bank of working chambers. In the illustrated embodiment, firing fraction and RPM are used as the indices for the lookup tables, although there may also be fewer or more indices. The firing patterns for both banks are arranged to collectively maintain the overall firing fraction.

The pattern sequencers 304a and 304b receive the firing patterns from their respective lookup tables 302a and 302b. Each pattern sequencer is arranged to generate a sequence of firing commands and match each firing command to a particular working chamber in the corresponding bank. In various embodiments, the pattern sequencer receives a cylinder number or other information that helps identify a particular working chamber. The pattern sequencer ensures that each firing command is applied to an appropriate working chamber and bank.

The interleaver receives as input the sequences of firing commands from the pattern sequencers 304a and 304b. The interleaver combines the sequences to generate a single firing command string that may interleave firings from both banks. (To use a simple example involving the banks in FIG. 2, if the firing order in the command string is 1-8-7-2-6-5-4-3, then the bank interleaving is B1, B2, B1, B2, B2, B1, B2, B1 and then repeats. In this example, B1 refers to bank 172 and B2 refers to bank 174.)

Figure 3B:
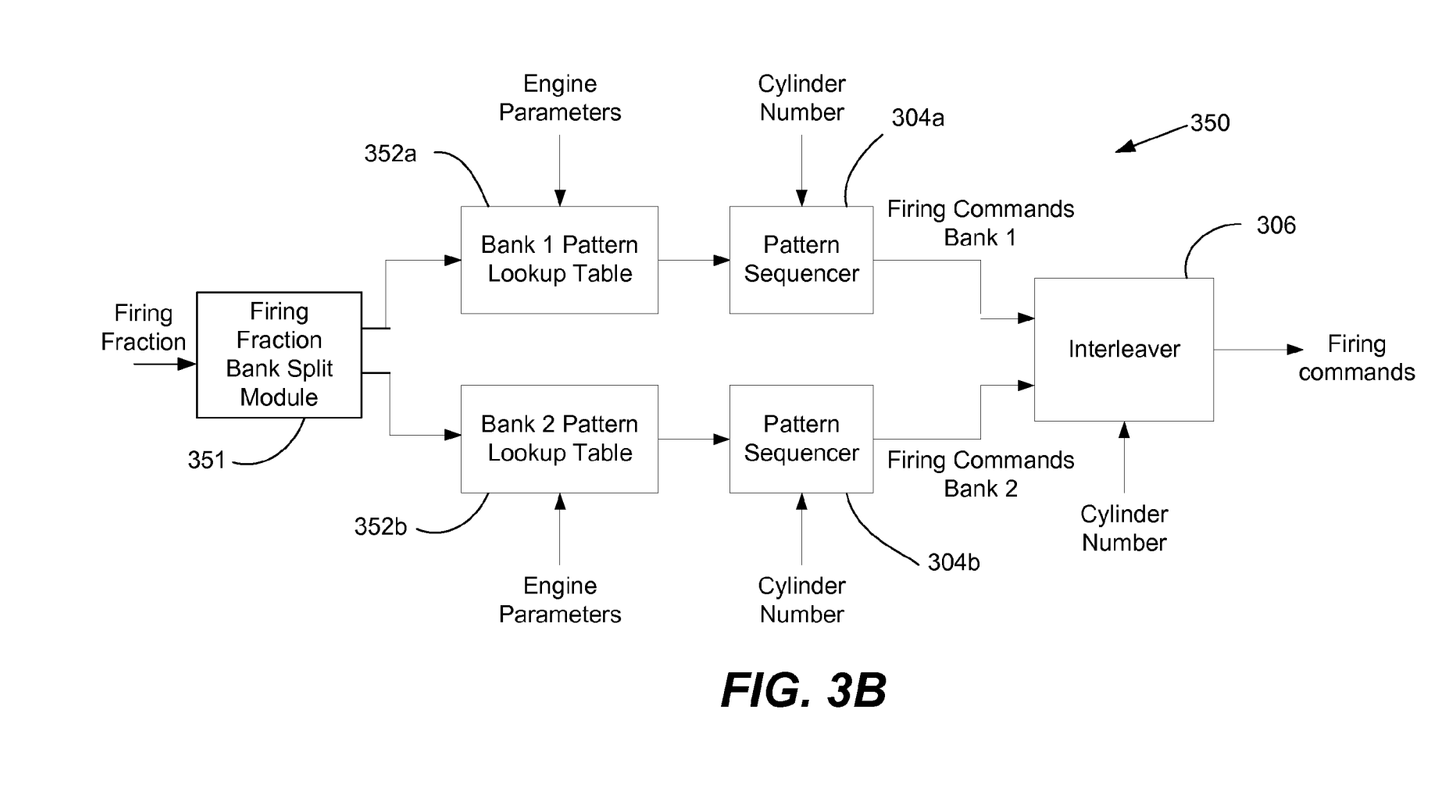
FIG. 3B is a split bank controller that has a firing fraction bank split module and uses a lookup table according to one embodiment of the present invention.

FIG. 3B shows an alternative embodiment of a split bank controller 350. This controller is similar to the controller shown in FIG. 3A, except that the firing fraction signal is first input into a firing fraction bank split module 351. The firing fraction bank split module 351 interrogates the input firing fraction. Depending on the input firing fraction the module 351 directs the appropriate firing fraction to each bank look up table module 352a and 352b. The firing fraction values directed to the banks may be equal or they may differ depending on the input firing fraction. An advantage of this architecture is the look up table structure in modules 352a and 352b can be simpler, since input firing fraction can have a unique firing pattern.

Figure 4:
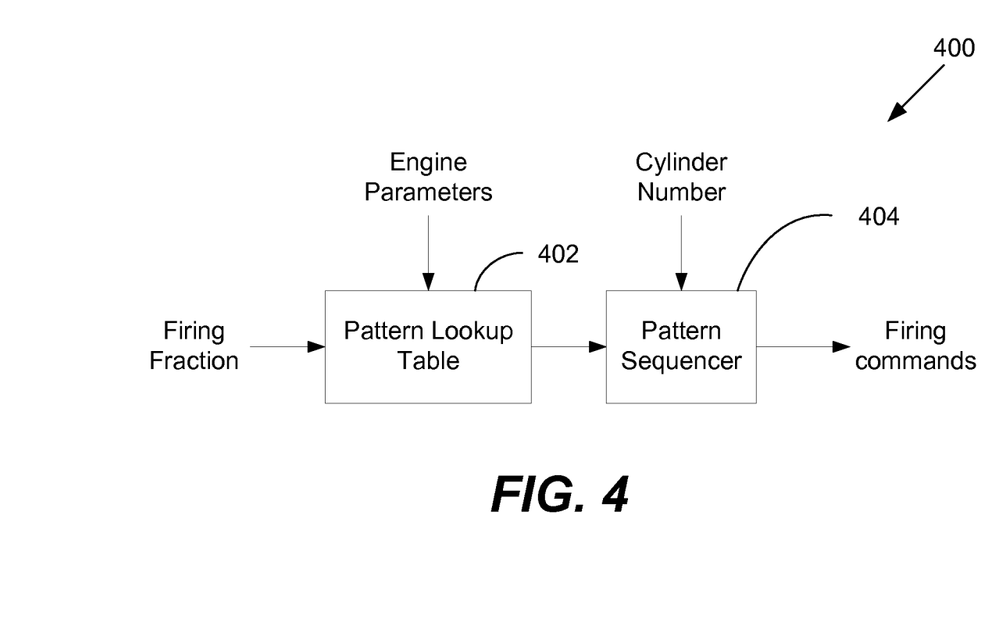
FIG. 4 is a split bank controller that uses a lookup table according to another embodiment of the present invention.

Although FIG. 3 illustrates a control path in which firing pattern are calculated independently for each bank using separate lookup tables and pattern sequencers, in other embodiments the same control path is used for multiple banks. An example of this is provided in FIG. 4. FIG. 4 illustrates a split bank controller 400 that includes a single pattern lookup table 402 and a single pattern sequencer 404. The functionality of look tables 302a and 302b is integrated into the pattern lookup table 402 and the functionality of pattern sequencers 304a and 304b are integrated into pattern sequencer 404. Otherwise, the split bank controller 400 can perform in generally the same manner as the split bank controller 300 of FIG. 3.

Figure 5:
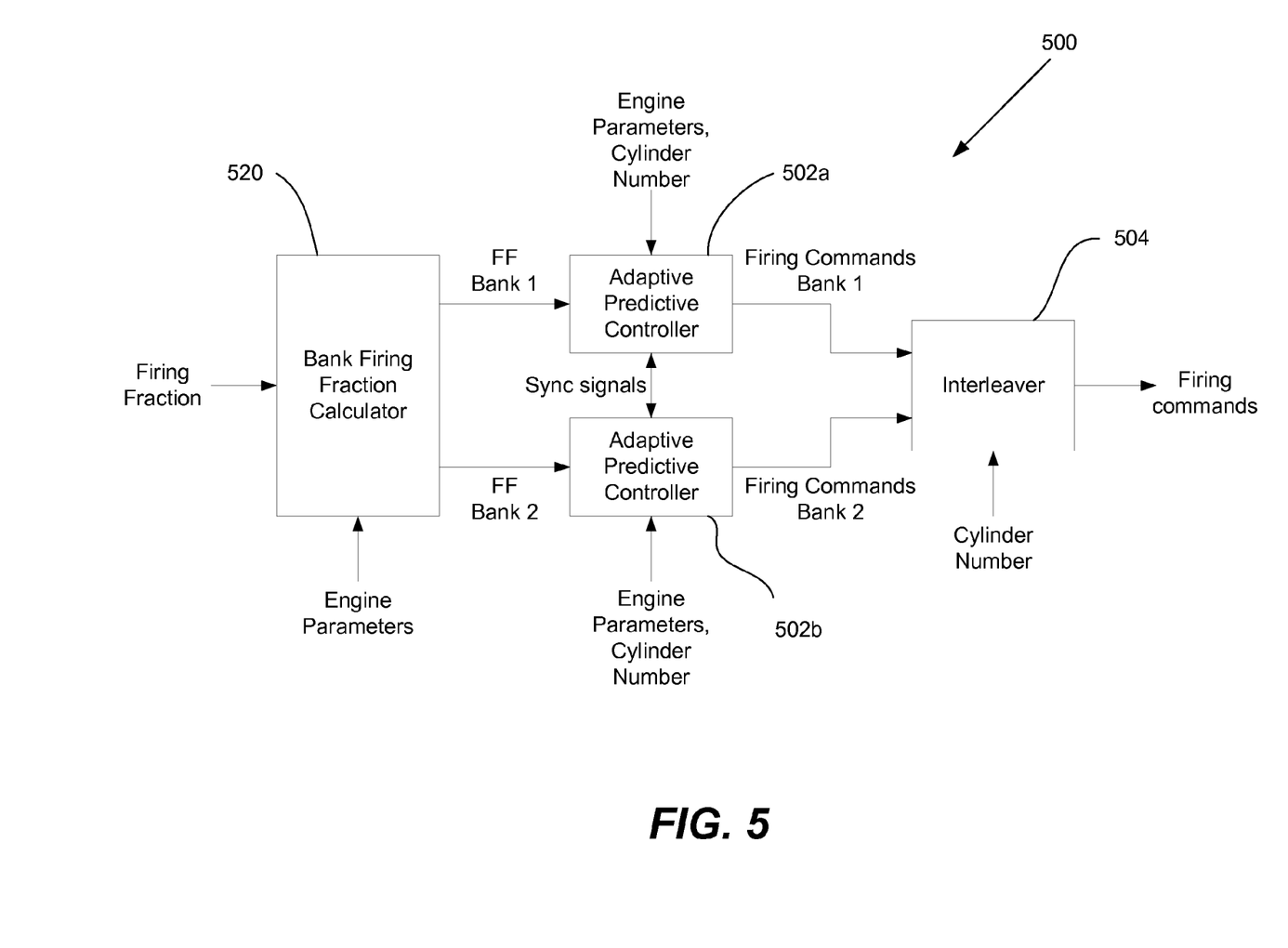
FIG. 5 is a split bank controller with adaptive predictive controllers according to one embodiment of the present invention.

Referring next to FIG. 5, a split bank controller 500 according to another embodiment of the present invention will be described. The split bank controller 500 includes a bank firing fraction calculator 520, adaptive predictive controllers (APCs) 502a and 502b and an interleaver 504. The APCs may include, for example, sigma delta converters. The overall firing fraction (e.g., the commanded firing fraction 119 of FIG. 2) is received as an input by the bank firing fraction calculator 520. The calculator 520 also receives input signals indicative of one or more engine parameters, such as the engine speed (RPM), MAP, gear, etc.

The bank firing fraction calculator uses these inputs to determine firing fractions for each engine bank (e.g., banks 172 and 174 of FIG. 1). Generally, the weighted sum of the bank firing fractions will equal the overall firing fraction. In some embodiments, the calculator is integrated into the same module that generates the overall firing fraction (e.g., the firing fraction calculator 112 of FIG. 2).

The bank firing fractions are then transmitted to APCs 502*a* and 502*b*, respectively. The controllers 502*a* and 502*b* use the received bank firing fractions to generate a distinct sequence of firing commands for each bank. Additional inputs to the controllers may include one or more engine parameters, such as engine speed (RPM), gear, MAP, etc. Any suitable adaptive predictive algorithm may be used for this conversion, including any technique discussed in U.S. Pat. No. 8,131,445, which is incorporated herein by reference in its entirety for all purposes. The controllers are also arranged to exchange signals and synchronize with one another, so that the controllers start with the best phase relationship with respect to one another. This relationship can be determined for each firing fraction.

The firing commands from each APC are then outputted to the interleaver 504, which combines the sequences into a single string of firing commands. The firing commands are then transmitted to the ECU (e.g., ECU 140 of FIG. 2), which orchestrates the actual firings.

Figure 6:
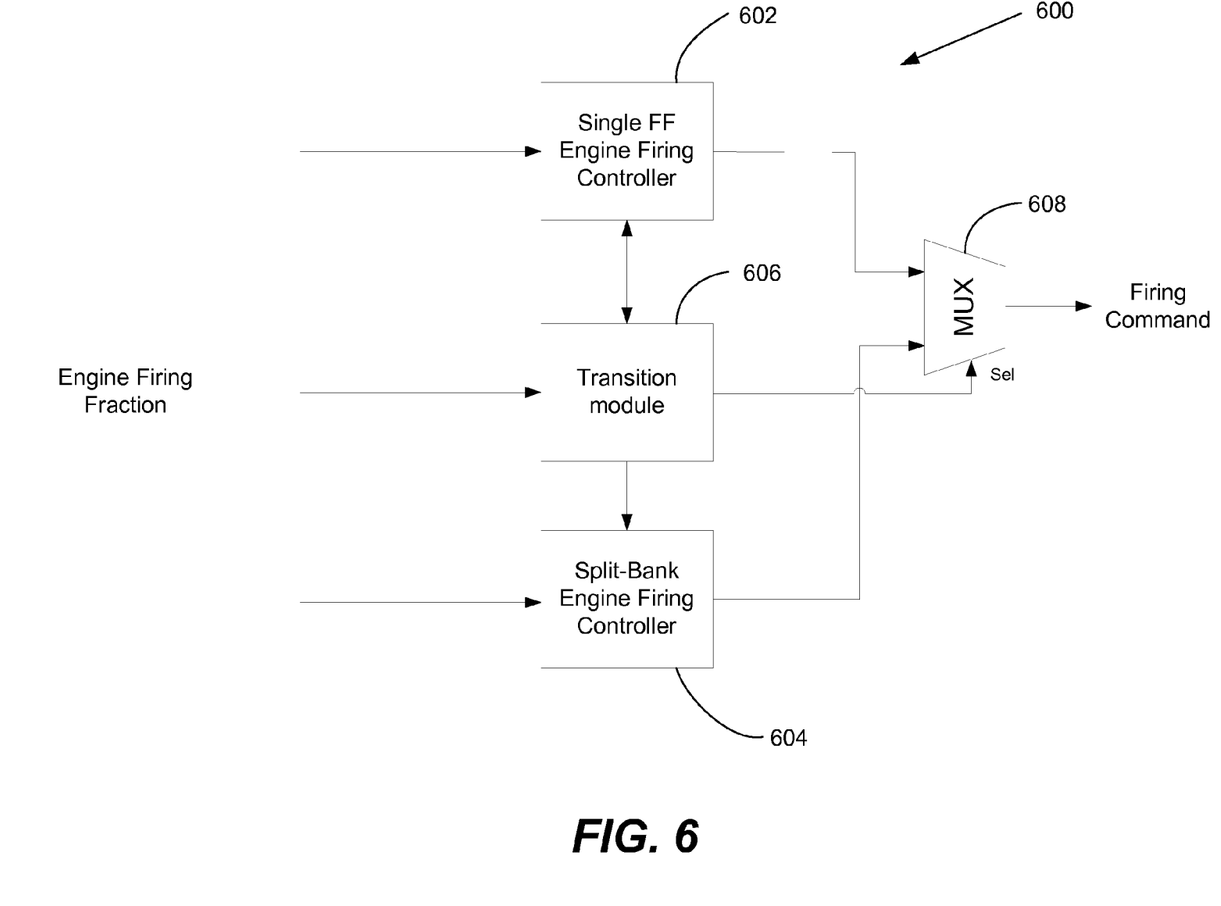
FIG. 6 is an engine controller with multiple modes of operation according to one embodiment of the present invention.

Referring next to FIG. 6, a multimode engine controller 600 with multiple modes of operation according to another embodiment of the present invention will be described. The multimode engine controller 600 includes a single firing fraction engine firing controller 602, a split bank engine firing controller 604 and a transition module 606. In the illustrated embodiment, the controller 600 is arranged to switch between two different modes of operation, a split bank mode as previously discussed and a more conventional skip fire mode.

The single firing fraction engine controller 602 includes one or more modules that determine a sequence of firing commands based on the overall engine firing fraction. Various examples of this controller have been described in the aforementioned co-assigned patents and patent application. Generally, the single firing fraction engine controller treats each working chamber equally i.e., it does not differentiate between working chambers based on which bank they belong to.

The split bank firing fraction controller 604 is arranged to treat banks differently e.g., different firing fractions and/or firing sequences are generated for different subsets of the working chambers. In various embodiments, each subset is defined based on the physical position of the working chambers (e.g., each subset of working chambers is in a separate bank), although the subsets may be defined based on other criteria as well. Examples of such controllers are described above in connection with FIGS. 1-6.

The transition module is arranged to manage shifts between the two modes i.e., between the single firing fraction controller 602 and the split bank firing fraction controller 604. When a shift to a particular controller is appropriate, the transition module 606 sends a signal to the controller indicating that a firing command sequence should be outputted. Another signal is also received at the multiplexer 608 from the transition module 606, indicating that the firing command sequence from the chosen controller should be outputted to the ECU (e.g., ECU 140 of FIG. 2). The ECU then arranges for the firing of the working chambers of the engine in accordance with the selected sequence of firing commands.

The firing fraction helps dictate the shift between the controllers. Some firing fractions may not require treating different banks of working chambers in a different manner. Other firing fractions, however, may cause acoustic problems that can be remedied by the split bank controller techniques that were discussed above.

In some embodiments, the single firing fraction engine controller 602 is generally preferred, except for particular firing fractions that work better with a split bank approach. By way of example, the single firing fraction engine controller 602 may be used while the firing fraction is transitioning towards a particular predetermined threshold, at which point the firing commands from the split bank engine controller are used. To use a simple example, assume that a firing fraction of 33% or ⅓ is a firing fraction best suited for a split bank approach. Assume further that the current firing fraction is 50%. As the firing fraction dips from 50% towards 34%, the multiplexer will transmit the firing commands to the ECU from the single firing fraction engine firing controller 602, rather than the split bank engine firing fraction controller 604. Once the 34% threshold is reached, the transition module will cause the multiplexer to instead transmit the firing sequence from the split bank engine controller.

As indicated by the above example, an exact match with the firing fraction threshold is not required to trigger a shift from one mode to another. In some embodiments, the range around a target firing fraction that, when reached, triggers a shift to a particular mode can be approximately +/−1% of the target firing fraction, although smaller and larger ranges are also possible.

The shift between controllers or different control modes may also include hysteresis in the control logic. In this manner a shift between different control modes may only occur after a predetermined time period. The magnitude of the temporal hysteresis may vary depending on the current engine operating conditions. Adding hysteresis to the control logic prevents bouncing back and forth between different control modes in an undesirable manner. The temporal hysteresis can be combined with hysteresis about the firing fraction value, as discussed in the previous paragraph.

The controllers 602 and 604 and the transition module 606 may each receive input signals from any suitable engine parameter, such as gear, engine speed (RPM), measured performance metrics, etc. These inputs can cause the transition module 606 to change its selection of a controller using the multiplexer 608. For example, assume that the single firing fraction controller 602 is generating a pattern with a low level of vibration that is acoustically unpleasant. Under conditions in which vibration matters more than sound (e.g., when the gear is low, the MAP is high and the RPM is low), the transition module 606 may choose to use the single firing fraction controller 602. Under other circumstances, it may choose to use the split bank engine firing controller 604. In some embodiments, where performance metrics (for vibration and acoustics) can be measured and are available, they can be used as parameters for transition strategies.

The output of the multiplexer 608 may be fed back into one or both of the controllers. The controller may then regularly update their internal state irrespective of which controller is currently being used to operate the engine. In another embodiment, a selected controller may be refreshed or restarted with a predetermined state when it is used to generate the firing sequence.

Figure 7:
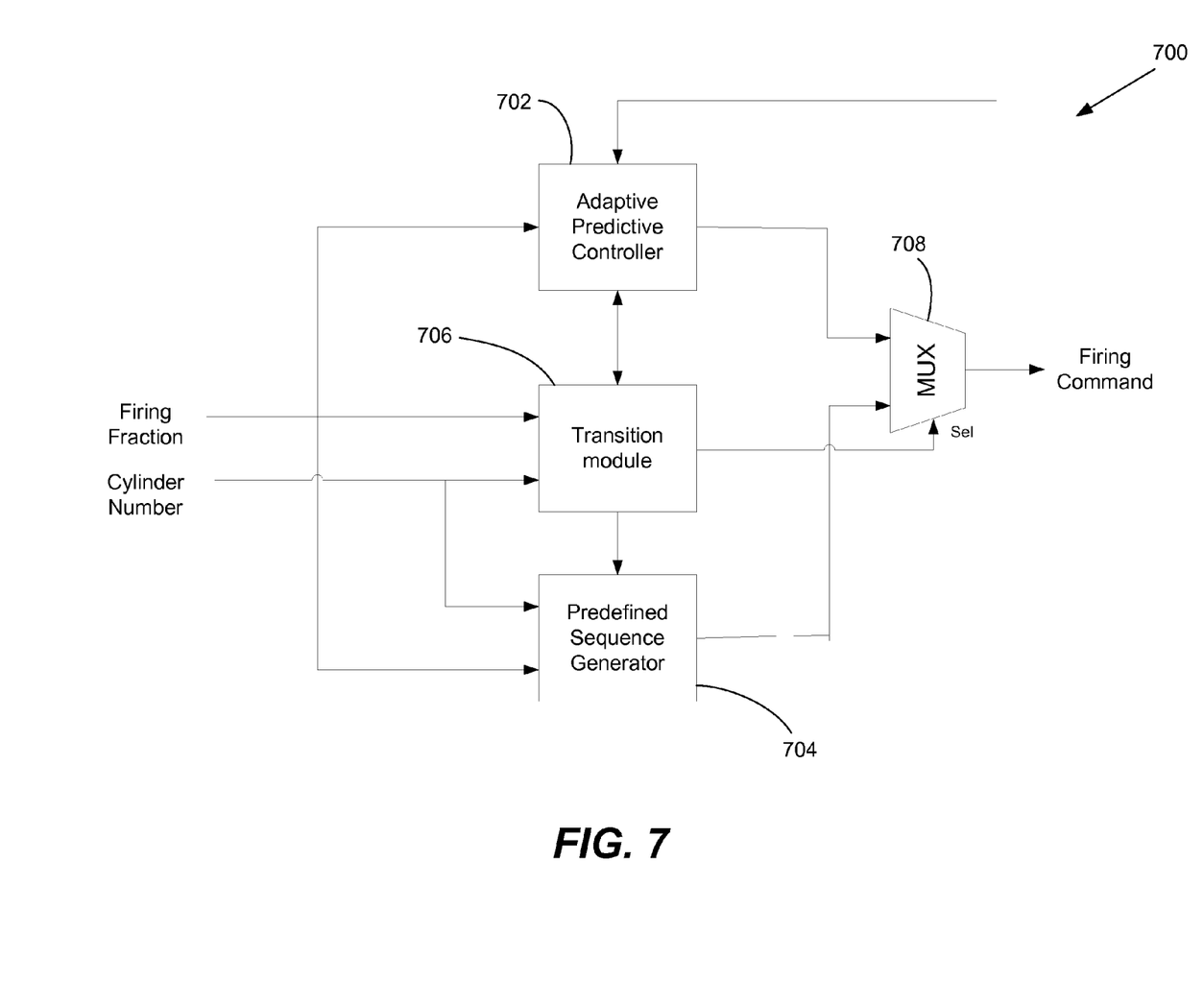
FIG. 7 is a skip fire engine controller with the ability to switch between an adaptive predictive controller and a predefined sequence generator according to one embodiment of the present invention.

The techniques described above can be used in connection with shifts not just between split bank/non-split bank modes, but also between any suitable skip fire operational modes. Referring next to FIG. 7, a skip fire engine controller with two different modes of operation will be described. The skip fire engine controller includes an adaptive predictive controller (APC) 702 (which can be similar or identical to APC 502a of FIG. 5), a predefined sequence generator (PSG) 704, a transition module 706 and a multiplexer 708. The controllers, transition module and multiplexer can have any of the features of the corresponding modules in FIG. 6.

The PSG 704 outputs predefined sequences of firing commands in response to different firing fractions or torque levels. For particular firing fractions, a predefined sequence may be superior in terms of NVH characteristics than one generated using the APC 702. In some designs, the predefined sequence generator is used for one or more firing fractions or ranges of firing fractions, while the adaptive predictive controller is used for other firing fractions. That is, an exact fire fraction need not be reached to trigger the switch to the PSG. A range of approximately +/−1% of a particular firing fraction works well for various applications. Also, the switch to APC need not commence immediately upon a change in the firing fraction from the target firing fraction. Rather, the switch could be made after the firing fraction exceeds a particular range (e.g., +/−1% of the firing fraction) around the target firing fraction.

In some embodiments, the transition module 706 causes the switch to occur at the very next firing opportunity. For example, assume that the PSG 704 has been selected by the transition module 706 based on a change in the input firing fraction. In this example, the transition module 706 then sends a control signal to the PSG 704 to output its fixed sequence. Additionally, the transition module 706 sends a signal to the multiplexer 708 indicating that the sequence from the PSG 704 should be outputted to the ECU, rather than a sequence from the APC 702. In some embodiments, the PSG 704 receives a cylinder number that it uses to determine the starting index for its stored, predefined firing sequence.

The characteristics of the sequences stored in the PSG 704 can vary widely, depending on the needs of a particular application. The sequences may differ in length for different firing fractions. The sequence length is also not dependent on the number of cylinders or working chambers.

Figure 8:
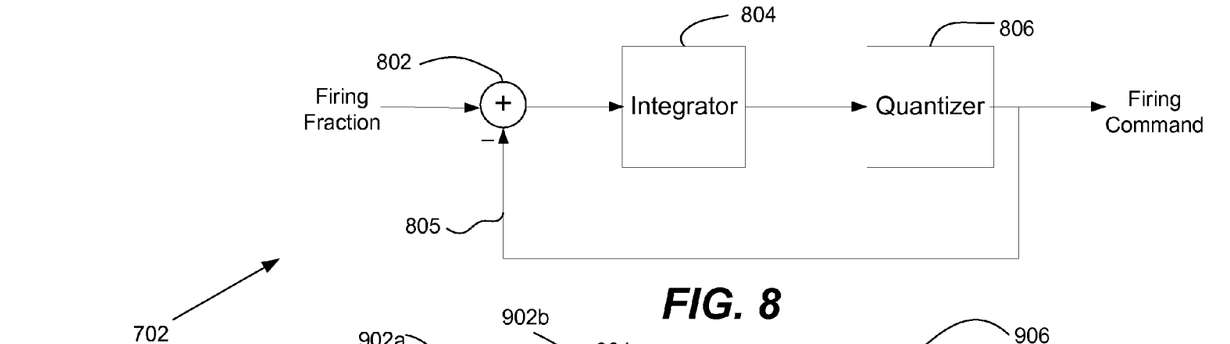
FIG. 8 is a close-up view of the adaptive predictive controller of FIG. 7.

Referring next to FIG. 8, a close-up view of the APC 702 according to one embodiment of the present invention will be described. The APC 702 includes an adder 802, an integrator 804 and a quantizer 806. In the illustrated embodiment, the APC 702 is a first order sigma delta controller, although any suitable type of adaptive predictive controller may be used. Various types of suitable adaptive predictive and sigma delta controllers are described in the aforementioned co-assigned patent and patent applications.

The input signal is a firing fraction that is provided as a positive input to the controller 702 and particularly to the integrator 804. The integrator 804 is also configured to receive a feedback signal 805 that is a function of the output such that the operation of the controller is adaptive. The feedback signal 805 is combined with the input signal using the adder 802. The output of the integrator 804 is provided to a quantizer 806. The quantizer 806 provides a one-bit output signal that indicates a sequence of firing commands.

Figure 9:
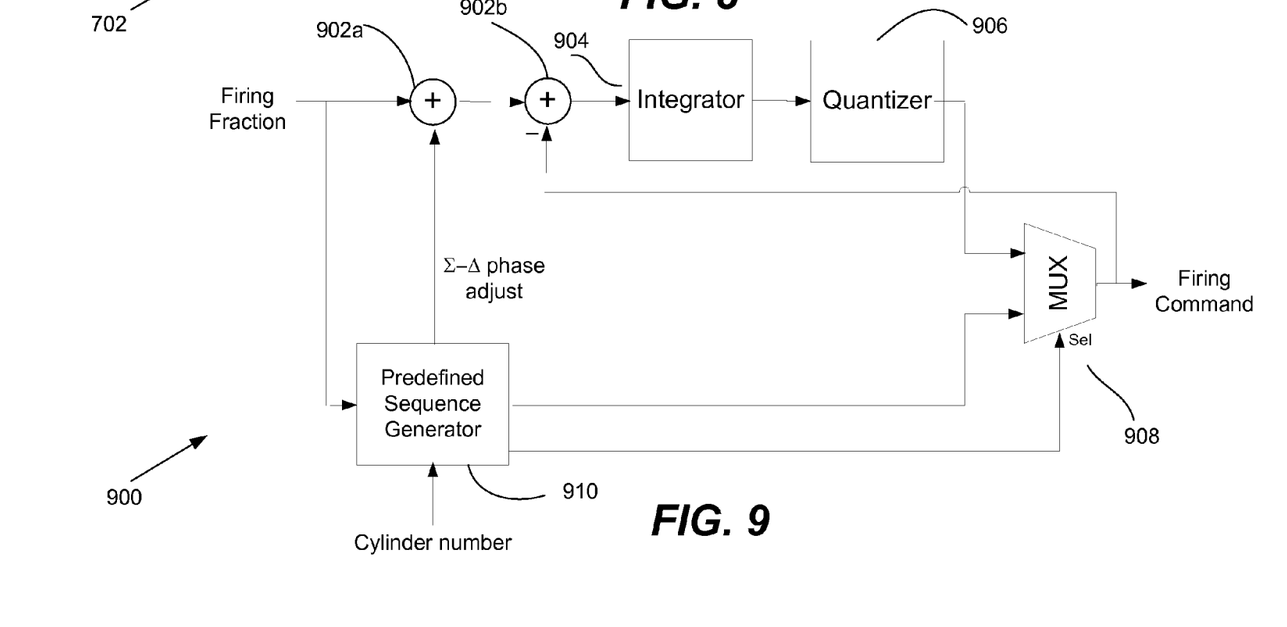
FIG. 9 is a skip fire engine controller with the ability to switch between an adaptive predictive controller and a predefined sequence generator according to another embodiment of the present invention.

Referring next to FIG. 9, a representative multimode skip fire engine controller 900 that incorporates the APC 702 of FIG. 8 will be described. The skip fire engine controller 900 includes a first adder 902a, a second adder 902b, an integrator 904, a quantizer 906 and a multiplexer 908. The second adder 902b, integrator 904 and quantizer 906 can function in a manner generally similar or identical to the corresponding components in FIG. 8. The PSG 910 may have any of the features discussed in connection with the PSG 704 in FIG. 7.

The skip fire engine controller 900 is arranged to generate a firing sequence using either a first order sigma delta controller (i.e., including adder 902b, integrator 904 and quantizer 906) or the PSG 910. The skip fire engine controller 900 is configured to facilitate transitions between the first order sigma delta controller and the APC 702. More specifically, when switching from the sigma delta controller to the PSG 910, a switch may be made almost immediately. If the controller 900 is not suitably configured, an immediate switch can cause a torque disturbance (e.g., double firings.) For example, this may occur when the sequence generated by the sigma delta controller happens to end with a firing and the predefined sequence generated by the PSG 910 begins with a firing. This can result in an undesirable double firing. The potential torque disturbance can then be avoided by adjusting for the above situation.

To prevent this situation, the PSG 910 outputs a signal that is combined with the firing fraction input by the first adder 902a. This signal adjusts the integrator 904 over a number of firings before a switch is made from one mode to another, so that an extra firing or an extra lack of a firing is avoided (i.e., indicated by the "Σ-Δ phase adjust" in FIG. 9.) The PSG 910 also outputs a signal that controls the multiplexer 908. Based on this signal, the multiplexer forwards the firing sequence from either the predictive adaptive controller and quantizer or the PSG.

It should be appreciated that while the drawings refer to particular types of controllers as part of a multimode control scheme, it should be appreciated that the each controller can be replaced by any suitable other controller. That is, the switching mechanisms discussed above can be used to switch between any two suitable types of controllers e.g., switching between two different types of adaptive predictive controllers.

Any and all of the described components may be arranged to refresh their determinations/calculations very rapidly. In some preferred embodiments, these determinations/calculations are refreshed on a working cycle by working cycle basis although, that is not a requirement. An advantage of the working cycle by working cycle operation of the various components is that it makes the controller very responsive to changed inputs and/or conditions. Although working cycle by working cycle operation is very effective, it should be appreciated that the various components (and especially the components before the firing timing determining module 120) can be refreshed more slowly while still providing good control (as for example by refreshing every revolution of the crankshaft, etc.).

In many preferred implementations firing decisions are made on a working cycle by working cycle basis. This does not mean that the decision is necessarily made at the same time as the actual firing. In some implementations, the firing decisions are made contemporaneously, but not necessarily synchronously, with the firing events. That is, a firing decision may be made immediately preceding or substantially coincident with the firing opportunity working cycle. In other embodiments, the firing decision may be made one or more working cycles prior to the actual working cycle. For example, in a particular embodiment involving a four stroke, eight cylinder engine, the firing decision is made approximately eight working cycles before the actual working cycle, although in other embodiments the firing decision may be made earlier or later. Furthermore, although many implementations independently make the firing decision for each working chamber firing opportunity, in other implementations it may be desirable to make multiple (e.g., two or more) decisions at the same time.

The invention has been described primarily in the context of controlling the skip fire operation of 4-stroke piston engines suitable for use in motor vehicles. However, it should be appreciated that the described skip fire operation approaches are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkins cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

The described controllers may be implemented within an engine control unit. In some applications it will be desirable to provide skip fire control as an additional operational mode to a more conventional mode of operation. This allows the engine to be operated in a conventional mode when desired.

Most of the skip fire controller embodiments described above utilize sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters may be used.

The present application describes various approaches for operating banks of working chambers differently. It should be understood that the meaning of the term, "bank," in this context means any group or subset of working chambers, and does not necessarily mean a physically distinct and spatially separate set of working chambers (e.g., as shown in FIG. 1). For example, an in-line 6 cylinder engine may be configured into two "banks", where the first bank is formed by the first three cylinders in the engine and the second bank is formed from the remaining cylinders.

It should be also appreciated that any of the operations described herein may be stored in a suitable computer readable medium in the form of executable computer code. The operations are carried out when a processor executes the computer code. Such operations include but are not limited to any and all operations performed by the firing fraction calculator, the firing timing determination module, the transition module or any other module, component or controller described in this application.

Although only a few embodiments of the invention have been described in detail, it should be appreciated that the invention may be implemented in many other forms without departing from the spirit or scope of the invention. For example, some of the embodiments described herein involve FIGS. 1 and 10, which illustrate an engine with eight cylinders. It should be appreciated that in various embodiments, the engine may have non-cylinder working chambers or fewer or more working chambers. The drawings and embodiments also sometimes refer to determining distinct firing fractions and/or sequences of firing commands for each bank of working chambers. The present invention also contemplates applying such techniques not just to physically distinct banks of working chambers, but to selected subsets of working chambers. That is, the grouping of working chambers into a particular subset need not depend on physical location or arrangement, but instead may depend on other suitable criteria. Therefore, the present embodiments should be considered illustrative and not restrictive and the invention is not to be limited to the details given herein.

What is claimed is:

1. An engine controller arranged to operate an internal combustion engine in a skip fire manner, the engine having a plurality of working chambers organized into a plurality of banks, each bank having one or more of the working chambers, the engine controller comprising:
    a firing fraction calculator arranged to generate a firing fraction that delivers a desired amount of torque; and
    a firing timing determination module that is arranged to independently determine a distinct firing sequence for each bank for operating the bank in a skip fire manner such that the operation of each bank uses a different firing fraction and the banks collectively deliver the desired amount of torque.

2. An engine controller as recited in claim 1 wherein the firing fraction calculator is further arranged to determine a separate bank firing fraction for each bank.

3. An engine controller as recited in claim 1 wherein the firing timing determination module includes an interleaver that is arranged to interleave the distinct firing sequences generated for the different banks.

4. An engine controller as recited in claim 1 wherein the firing timing determination module is arranged to select a distinct firing sequence for each bank from a set of predefined firing sequences.

5. An engine controller as recited in claim 1 wherein the firing sequence for each bank is generated using a sigma delta converter.

6. An engine controller as recited in claim 1 further comprising:
    a transition module that is arranged to determine whether a distinct bank firing fraction should be generated for each bank of working chambers.

7. An engine controller as recited in claim 6 further comprising:
    a single firing fraction controller arranged to generate single firing fraction used to operate all banks of working chambers; and
    a split bank engine firing controller arranged to generate the distinct bank firing fraction for each bank wherein the transition module is arranged to determine whether output from the single firing fraction controller or the split bank engine firing controller is used to operate the engine.

8. An engine controller as recited in claim 1 wherein the firing timing determination module is arranged to generate the firing sequence for each bank on a firing opportunity by firing opportunity basis.

9. An engine controller arranged to operate an internal combustion engine in a skip fire manner, the engine including a plurality of working chambers, the engine controller comprising:
    a firing fraction calculator arranged to generate a firing fraction that delivers a desired amount of torque; and a transition module that is arranged to determine, based at least in part on the firing fraction, whether the firing fraction will be delivered by a firing sequence selected from a set of predefined firing sequences or is generated dynamically.

10. An engine controller as recited in claim 9 wherein if the firing sequence is generated dynamically, the chosen firing sequence is generated on a firing opportunity by firing opportunity basis.

11. An engine controller as recited in claim 9 wherein if the firing sequence is generated dynamically, the chosen firing sequence is generated using an adaptive predictive algorithm.

12. An engine controller as recited in claim 11 wherein the adaptive predictive algorithm used to generate the firing sequence is a sigma delta converter.

13. An engine controller as recited in claim 9 wherein:
the engine controller further comprises a firing timing determination module that is arranged to operate the working chambers in a skip fire manner using the firing sequence wherein the firing timing determination module is further arranged to generate the firing sequence based on the determination of the transition module;
the engine includes a plurality of working chambers that are organized into a plurality of banks, each bank including a subset of the working chambers; and
the firing timing determination module is arranged to select a distinct firing sequence from the set of predefined firing sequences for each bank.

14. An engine controller as recited in claim 13 wherein:
the engine controller further comprises an interleaver that is arranged to interleave the predefined firing sequences for the plurality of banks.

15. An engine controller as recited in claim 13 wherein:
the firing fraction calculator determines a distinct firing fraction for each bank such that the banks collectively delivered the desired amount of torque.

16. An engine controller as recited in claim 13 wherein the operating of the working chambers in a skip fire manner involves deactivating at least one selected working cycle of at least one selected working chamber and firing at least one selected working cycle of at least one selected working chamber wherein individual working chambers are sometimes deactivated and sometimes fired.

17. An engine controller as recited in claim 9 further comprising:

an adaptive predictive controller (APC) that is arranged to use an adaptive predictive algorithm to generate an APC firing sequence based on the firing fraction;
a predefined sequence generator (PSG) that is arranged to choose a predefined firing sequence from a plurality of predefined firing sequences based on the firing fraction, wherein the transition module is arranged to determine whether output from the APC or the PSG is used to operate the working chambers of the engine, the transition module being arranged to select a firing sequence selected from the group consisting of the firing sequence generated by the APC and the predefined firing sequence chosen by the PSG.

18. An engine controller as recited in claim 9 further comprising a multimode controller that is arranged to adjust the firing sequence to help eliminate double firing commands generated from a transition between a predefined firing sequence and a dynamically generated firing sequence.

19. A computer readable storage medium that includes executable computer code embodied in a tangible form operable to control an internal combustion engine having a plurality of working chambers, the working chambers being organized into a plurality of banks wherein the computer readable medium includes:
executable computer code for generating a firing fraction that delivers a desired amount of torque; and
executable computer code for independently determining a distinct firing sequence for each bank for operating the bank in a skip fire manner such that the operation of each bank uses a different firing fraction and the banks collectively deliver the desired amount of torque.

20. A computer readable storage medium that includes executable computer code embodied in a tangible form operable to generate a firing sequence for operating working chambers of an engine in a skip fire manner wherein the computer readable medium includes:
executable computer code for generating a firing fraction that delivers a desired amount of torque;
executable computer code for determining a firing sequence for operating the working chambers in a skip fire manner; and
executable computer code for determining whether the firing sequence is selected from a set of predefined skip firing sequences or is generated dynamically.

* * * * *